March 16, 1965  J. G. L. HANNICQ ETAL  3,174,087
PLURAL MOTOR CONTROL FOR COORDINATING THE OPERATION OF
VARIOUS SECTIONS OF DATA PROCESSING SYSTEMS
Filed Oct. 24, 1960  6 Sheets-Sheet 1

INVENTORS

JACQUES GEORGES LUCIEN HANNICQ
YVES-JEAN FRANCOIS BRETTE

BY Baldwin + Hight

ATTORNEYS

INVENTORS
JACQUES GEORGES LUCIEN HANNICQ
YVES-JEAN FRANCOIS BRETTE

BY Baldwin & Wight

ATTORNEYS

March 16, 1965 J. G. L. HANNICQ ETAL 3,174,087
PLURAL MOTOR CONTROL FOR COORDINATING THE OPERATION OF
VARIOUS SECTIONS OF DATA PROCESSING SYSTEMS
Filed Oct. 24, 1960 6 Sheets-Sheet 4

INVENTORS
JACQUES GEORGES LUCIEN HANNICQ
YVES- JEAN FRANCOIS BRETTE

BY *Baldwin + Hight*
ATTORNEYS

INVENTORS
JACQUES GEORGES LUCIEN HANNICQ
YVES-JEAN FRANCOIS BRETTE

BY Baldwin + Wight
ATTORNEYS

United States Patent Office 3,174,087
Patented Mar. 16, 1965

3,174,087
PLURAL MOTOR CONTROL FOR COORDINATING THE OPERATION OF VARIOUS SECTIONS OF DATA PROCESSING SYSTEMS
Jacques Georges Lucien Hannicq, Bagnolet, and Yves-Jean Francois Brette, Sevres, France, assignors to Compagnie des Machines Bull (Societe Anonyme), Paris, France
Filed Oct. 24, 1960, Ser. No. 64,587
Claims priority, application France, Nov. 5, 1959, 809,383, Patent 1,252,641; Mar. 15, 1960, 821,341
1 Claim. (Cl. 318—75)

This invention concerns data processing systems which carry out operations on recording media, such as record cards, or under the control of the latter.

The known systems of this type consist of separate machines which are each provided with all the members necessary for their independent operation. Consequently, the majority of these machines, regardless of their essential function, comprise not only similar auxiliary devices such as programming devices, stores, comparing devices, counters and pulse generators and distributors, but also a number of the main devices of the type performing respectively the main functions of dealing with the recording media, printing the statements, accumulation and calculation. It also follows that, in order to increase the possible tasks which can be performed by these machines, it is necessary to multiply in each of them the number of auxiliary and main devices of the type hereinbefore enumerated and that each of these devices is generally used only during a small fraction of the total time for which the machine with which it is associated is in use.

Moreover, when such systems consist of machines operating independently of one another, it happens that in the course of the performance of certain tasks involving the use of a plurality of these machines, one of them can commence to operate only after the production of an intermediate result to which the operation of another of these machines leads.

Under these operating conditions, the performance of certain tasks by means of such systems frequently involves the performance of intermediate subordinate operations either of a manual nature (punching intermediate results in certain cards, inserting reference cards in a card set) or of a mechanical nature (sorting, collating and reproduction).

In order to avoid the loss of time resulting from these working conditions, provision has been made in some cases to connect two or more machines together, for example in such manner that the operations which must be performed by one of these machines from intermediate results supplied by another of these machines can take place as and when these results are obtained, but it has been necessary, in order to render this connection possible, to provide particular means for each type of machine connected and for each type of connection involved, or to create machines which operate only in conjunction with certain machines with a view to a particular type of connection.

In fact, heretofore, such connections between machines have been made only for performing a limited number of well-defined tasks, and it has been necessary for different tasks to provide different adapting means between the machines employed.

Finally, the kinematic chains generally provided between the machines which it is desired to operate in conjunction with one another, as also those normally installed between different sections of the same machine, are costly and complicate the fitting and removal of certain parts of such machines.

For example, it is well known to connect a punching device to a tabulator with a view to enabling the punching device to record in accounting cards the results of calculations carried out on data supplied by other cards, in step with the calculation of these results and their printing by the members of the tabulator.

In this case, the cards bearing the data of the calculations are generally introduced into the tabulator and blank cards intended to receive the results are generally introduced into the punching device.

If it is desired that the results of each calculation should appear on the card bearing the data on which this calculation has been carried out, it is necessary to start a supplementary (reproducing) operation, in the course of which the results borne by the cards which have been punched after each calculation are reproduced on the cards bearing the data of the calculations.

If it is desired to avoid this supplementary operation, the cards bearing the data are introduced into the punching device, but it is necessary for the latter to comprise one or two scanning stations and for means to be provided for transmitting data, extracted from the cards, to the tabulator which effects the corresponding calculating and printing operations. Under these conditions, the track along which the cards are conveyed and the scanning stations of the tabulator remain unused during this work.

One object of the invention is to avoid the aforesaid disadvantages in systems of the type under consideration. In accordance with the invention, this result is obtained, on the one hand, by constructing data processing systems of the type under consideration from elements functioning in periodic cycles and each performing only one of the main functions of dealing with the recording media, printing the statements, accumulation and calculation, and on the other hand by eliminating from each element the auxiliary devices such as programming devices, stores, comparing devices, counters and pulse generators and distributors, which, since they are not specifically provided for one particular application, can be used by any elements allocated to different functions, and by grouping together the said auxiliary devices in such manner as to form auxiliary elements to which the various elements of the system can be simultaneously connected in such manner that these elements can operate simultaneously by co-operating one with the other and with these auxiliary devices in accordance with the programme of the operations to be carried out, the said elements being synchronised in phase, that is to say, in such manner that the characteristic instants of their operating cycles coincide at each cycle, and connections being so made as to render possible the transfer of data between elements and the mutual control of these elements by one another.

One object of the invention is therefore to organise a record-card data processing system consisting of mechanically separate elements operating in cycles and capable of co-operating in the same way as the various members of one machine with the aid of a synchronising device and a programming device, each of the said elements comprising, if desired, a plurality of sections which are also mechanically independent, but which are synchronised with one another by appropriate means.

In accordance with one embodiment of the invention, the control shafts of the various elements of the said system, and if desired of the various sections of one element, are each driven by a particular synchronous motor.

Known machines and machine assemblies can be modified, as will be shown by the description, in such manner as to form data processing systems according to the invention without its being necessary to modify the structure and the mode of operation of their component devices.

The systems designed and organised in accordance with the invention may comprise any number of mechanically independent elements which may, in principle, be disposed in any relative positions, and which operate synchronously under the control of a single programming device, in the same way as the various parts of one machine. Consequently, they are capable not only of carrying out with increased output the mechanographical tasks which such known systems can perform, but also of carrying out more important and more complex tasks than can be carried out by the said known systems.

Moreover, the systems according to the invention can simultaneously carry out entirely or partially independent tasks in accordance with established programmes, for example in such manner as to minimise the periods in inactivity of each of the component elements of the said systems.

The invention relates to a system of the aforesaid type, of which the arrangement and organisation conform to the principles hereinbefore set forth.

The invention concerns more particularly a system of this type which is characterised by one or more of the following arrangements:

The system consists of mechanically separate elements, each of which is arranged to be able to be electrically connected to any other element and to any number of other elements in such manner that it can form different combinations permitting the performance of various data processing tasks.

Each of the said elements is electrically connected to a central element, hereinafter called the "programme unit," which is provided with programming devices for controlling the operation of each of the elements which are connected thereto and co-ordinating the operation of the various elements with one another, in the same way that the programming devices of a record-card machine of known type control and coordinate the operation of the various members of such a machine.

The main functions of dealing with the recording media, printing the statements, accumulation and calculation are each performed by different elements.

The auxiliary devices such as stores, comparing devices, counters and pulse generators and distributors, which can each cooperate with any element of the system, are grouped on a particular element which can form a part of the programme unit.

Each element operates in period cycles and the period of the cycles of each element is equal to the period of the cycles of the other elements to within a simple factor, the cycle of longest period constituting the operating cycle of the system.

After having been started, the elements are caused to operate in synchronism and in phase with one another, that is to say, in such manner that characteristic instants of their operating cycles coincide at each cycle with characteristic instants of the operating cycle of the system and these operating conditions are intermittently checked during the use of the system.

A synchronising device controlled by a clock emitting periodic control and synchronisation checking pulses makes it possible to check the phase agreement of the elements and the maintenance of the synchronism.

Some elements consist of mechanically independent sections, the absence of mechanical links between the said sections having the effect of simplifying the construction, the fitting and the removal of the said elements, and certain characteristic features of the invention applicable to the elements are also applicable to the sections of elements.

Each element comprises a driving shaft continuously rotated by a synchronous motor through a reduction gearing and the motors of the elements fed by the same alternating voltage or by voltages synchronised with one another rotate synchronously. Consequently, the driving shaft of each element may be situated, at a given instant of the operating cycle of the system, in a number of given positions, the number of which is determined by and depends upon the construction of the motor and of the kinematic chain connecting the said motor to the said element.

A phase synchronising device is associated with each element and is so arranged as to bring the control shaft with which the element is associated, under the control of the clock, into predetermined angular positions at predetermined instants of each operating cycle of the system when the motor of the element is rotating synchronously.

For a better understanding of the invention and the manner in which it is to be performed, the same will now be described, by way of example, with reference to the accompanying drawings, in which.

The elements illustrated by the rectangles 10, 20, 30, 40 and 50 (FIGURE 1) are respectively those comprising the programming devices, the non-specialized auxiliary devices (such as stores, comparing devices, counters and pulse generators and distributors), the devices for handling and scanning cards, the devices for printing statements and the accumulating devices of an electromechanical tabulator. The rectangle 60 represents a punching device, which may be connected to the tabulator. The elements 10 and 20 may be combined in accordance with the invention to form what will be called the programme unit and denoted by the reference 10–20. The other elements 30, 40, 50 and 60 will be called respectively the reading track element, the printing element, the accumulator element and the punching track element.

Figure 1:
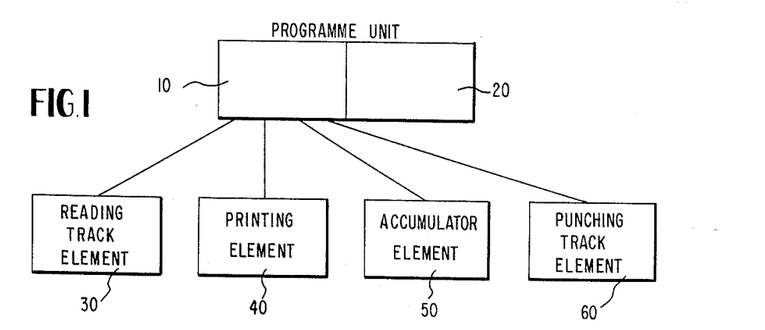
FIGURES 1 to 5 show various groups of mechanographical elements according to the invention.

Electrical conections diagrammatically illustrated in FIGURE 1 by lines joining the aforesaid rectangles are established between the said elements in such manner that the electrical circuit diagram of the assembly is identical or equivalent to the electrical circuit diagram of well know systems constructed from an electromechanical tabulator and a connected punching machine.

In such systems, no direct mechanical link exists in the tabulator between the devices which are employed in accordance with the invention to form the various elements hereinbefore defined, but each of these devices is mechanically connected to a common driving shaft actuated with a continuous rotational movement, in order to satisfy the conditions of synchronous operation of the assembly.

It is obvious that these operating conditions are also satisfied when the said devices are mechanically connected to separate driving shafts actuated with a continuous rotational movement, if the rotational movements of the said shafts are themselves synchronised in phase, that is to say, in such manner that reference marks disposed on these shafts are at each instant in corresponding angular positions and that, consequently, corresponding characteristic instants of the operating cycle of the devices which they drive coincide at each cycle.

Each element therefore comprises an electric motor and a driving shaft continuously rotated by the said motor, and the devices forming part of the element receive the mechanical energy from the said shaft in a manner identical or equivalent to that in which the same devices comprised in the tabulator of the aforesaid type receive the mechanical energy from the driving shaft of the said tabulator.

In addition, a synchronising device is provided to cause the driving shafts of the elements to rotate in such manner that corresponding characteristic instants of the operating cycle of these elements coincide at each cycle.

When thus constructed and arranged, the elements 10–20, 30, 40 and 50 can be mounted on separate frames, theoretically at any variable distances apart. Nevertheless, they continue to co-operate in the same way as the component parts of one machine owing to the electrical connections and to the aforesaid phase synchronising devices, and their combined operation remains identical from the mechanographical viewpoint to that of the tabulator from which they are derived.

It is now possible, from the elements hereinbefore defined, to constitute record-card data processing systems which are not equivalent to the tabulator of the type mentioned and which need not be equivalent to any of the known machines.

In accordance with one feature of the invention, it is possible to construct mechanographical systems from simplified assemblies of elements of the type previously defined which comprise only some of these elements.

Figure 2:
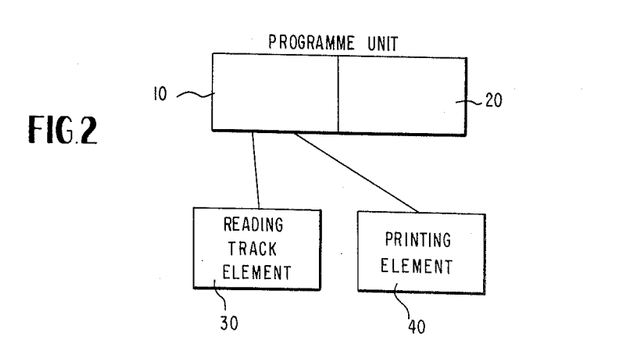

FIGURE 2 illustrates by way of example an assembly comprising the elements 10–20, 30 and 40, that is to say, respectively, the programme unit, the reading track element and the printing element. Such a system makes its possible to print statements under the direct control of record cards.

Figure 3:
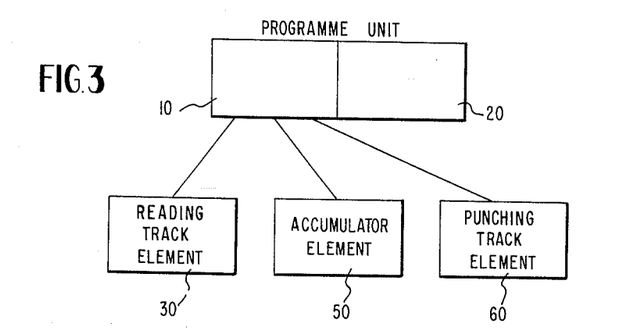

FIGURE 3 illustrates an assembly comprising the elements 10–20, 30, 50 and 60, that is to say, respectively, the programme unit, the reading track element, the accumulator element and the punching track element. Such a system is particularly suitable for the preparation of recapitulative cards from cards bearing elements of calculations.

It will be seen that it might be advantageous in some cases to provide a mechanographical workshop with the assemblies illustrated in FIGURES 2 and 3, rather than with two tabulators, one of which would be provided with a connected punching device. The cost of the devices comprised in a printing element and in a calculating element is thus saved. In addition, the elements composing the assemblies illustrated in FIGURES 2 and 3 may be used to form other assemblies in accordance with the invention, for example assemblies of the type illustrated in FIGURE 1 or of the type which will hereinafter be mentioned.

In accordance with another arrangement of the invention, it is possible to construct mechanographical systems from elements of the type previously defined, by forming assemblies of such elements, such assemblies comprising a plurality of some of the said elements.

Figure 4:
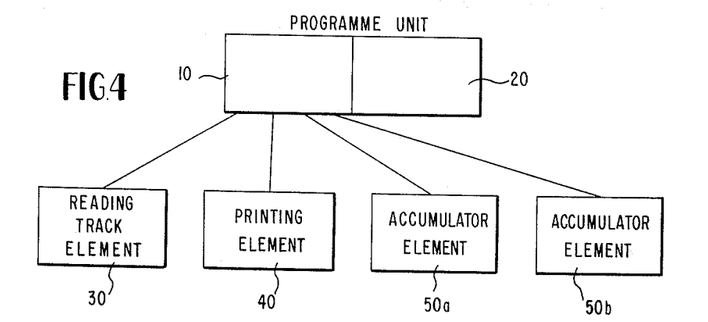

FIGURE 4 illustrates by way of example an assembly comprising two accumulator elements 50a and 50b and in addition the elements 10–20, 30 and 40, that is to say, respectively, the programme unit, the reading track element and the printing element. Such a system obviously affords greater possibilities of calculation than a tabulator of the type mentioned.

Figure 5:
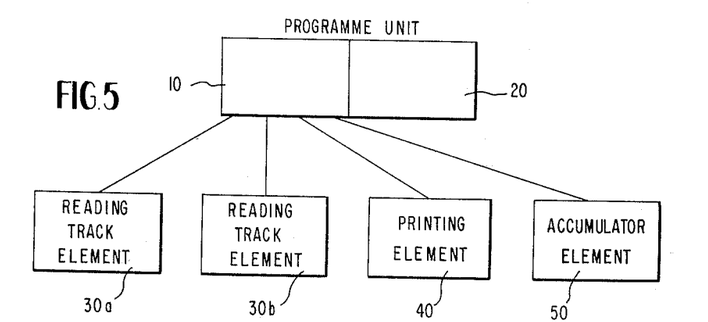

FIGURE 5 illustrates a system comprising two reading track elements 30a and 30b, as also the elements 10–20, 40 and 50, that is to say, respectively, the programme unit, the printing element and the accumulator element.

Such a system may be employed, for example, for printing data supplied by the cards disposed in the magazine of the first track element and for accumulating, for the purpose of printing totals, data supplied by the cards disposed in the magazine of the second track element.

It will be seen from the few examples given in the foregoing, without its being necessary to enumerate all the possible forms of application of the invention, that many different mechanographical assemblies can be constructed and organised in accordance with the invention by using only a small number of different elements of the type hereinbefore defined. In addition, the number of elements which it is possible to use simultaneously for forming mechanographical assemblies according to the invention is not limited, so that the number of different assemblies which can thus be constructed is theoretically unlimited. A number of programme units can then be connected in one and the same system to provide the latter with a sufficient number of auxiliary members.

Since the elements of one assembly can in principle be positioned in relation to one another in any desired manner, it is possible to provide in accordance with the invention a system which comprises, for example, elements situated in a central office and arranged to print recapitulative statements under the control of reading track elements situated in different remote offices, these reading track elements being connected by appropriate transmission means to the elements situated in the central office. It will be seen from this that some methods and devices peculiar to the technique of long-distance electrical transmissions can advantageously be employed in some systems designed in accordance with the invention.

It has been assumed in the foregoing description that the elements serving to form various mechanographical systems according to the invention consist of certain portions of known machines, but it is also proposed in accordance with the invention to use for forming such systems particular apparatus which differ from these portions of machines and which, in some cases, can be better adapted to the application under consideration.

Thus, apparatus of the type described in United States patent application Serial No. 34,402, filed on June 7, 1960, for "Improvements in Record-Card Machines," now Patent No. 3,116,922, are particularly suitable for use in the systems designed in accordance with the present invention.

The electronic computers and other apparatus which are connected in known manner to tabulators may equally well be connected to systems according to the invention.

Moreover, it is possible to provide systems according to the invention with the aid of apparatus operating in periodic cycles, the frequency of which is a multiple of that of the said systems. It is thus possible to use, for example, apparatus handling forms at very high speed.

Independently of their composition and their arrangement, the systems defined by the foregoing description are also characterised by certain particular means which are employed to cause the mechanically distinct elements of which they are formed to operate synchronously and in phase with one another.

There will therefore now be described with reference to FIGURES 6 to 11 various arrangements which are particularly suitable for the synchronisation in phase of elements such as those previously defined, in the case where the driving shafts of these elements are driven through reduction gearing by synchronous motors fed by means of a common alternating-current source or by means of separate alternating-current sources synchronised with one another.

When a synchronous motor drives a shaft through a reduction gearing, there exists at each instant when the motor rotates at its synchronous speed a number of possible angular positions of the said shaft. This number of positions depends both upon the construction of the motor and upon the construction of the reduction gearing, and these positions are well defined at a given instant of the feed voltage.

When, for example, a bipolar asynchronous motor synchronised by reluctance drives a shaft through a reduction gearing having a ratio of 1:10, there exist at synchronism twenty possible angular positions of equilibrium of the shaft at each instant and these positions are well determined at a given instant of the period of the feed voltage for a given load.

In order that a shaft driven in the aforesaid manner may be situated, at a given instant of certain cycles of the feed voltage, in a particular position among its various possible positions of equilibrium at this instant, this position corresponding, for example, to a particular moment of the operating cycle of the mechanism which it controls, it is proposed in accordance with the invention to check the position of the said shaft at this instant in the course of certain cycles of the feed voltage and, if the shaft is not situated in this particular position at the said instant, to produce a momentary interruption of the feed of the driving motor so as to produce a change in its position of equilibrium.

If the new position of equilibrium obtained is not the desired particular position, the same operation recommences and so on until the desired position is obtained, whereafter the action of momentarily interrupting the feed is discontinued.

The duration of the momentary interruption will be so chosen, for example, that the shaft successively takes up its various successive positions of equilibrium when the indicated operation is repeated.

When a number of synchronous motors are employed, each of which drives, as stated, the driving shaft of an element of the type hereinbefore defined, the synchronisation in phase of the various elements driven by these motors can be effected by causing each of the driving shafts of the said elements, by the aforesaid method, to be situated at a given instant in certain cycles of the feed voltage, in a particular position among the various positions of equilibrium whch it can occupy at this instant, this particular position corresponding to a particular instant in the cycle of operation of the element which it drives.

In accordance with the embodiments of the invention as illustrated in FIGURES 6 to 11, a phase synchronisation device is associated with each synchronous motor and an apparatus hereinafter called a clock, which is advantageously incorporated in the programme unit, supplies two series of periodic pulses to each of the synchronising devices. These pulses will hereinafter be called the synchronisation checking pulses and control pulses of the contactors. Their front and rear flanks are situated, at particular instants, in certain cycles of the alternating feed voltage. These series of pulses have the same period and this period will be regarded as being that of the operating cycle of the clock.

Each cycle of the clock comprises a fixed number of cycles of the alternating feed voltage and a given instant of each of the latter cycles will be used to define a point of the cycle of the clock so as to locate the various instants of each clock cycle. In addition, each clock cycle is equal to an integral number of operating cycles of the elements.

Figure 6:
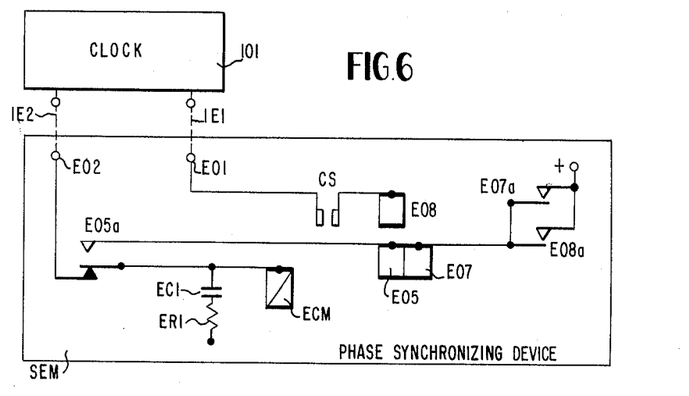
FIGURE 6 illustrates the electric circuit of a synchronising device according to one embodiment of the invention.

A first constructional form of the phase synchronising device is illustrated in FIGURE 6. This figure shows the clock 101 and a phase synchronising device SEM associated with the driving motor of an element (or of an element section). Electric conductors 1E1 and 1E2 (FIGURE 6) are disposed between the said clock 101 and the input contact studs EO1, EO2, respectively, of the device SEM. This device is incorporated in the element (or in the element section) comprising the motor with which it is associated. It consists essentially of an electrical circuit controlling the contactor ECM of the feed circuit of the motor.

In the diagrammatic representation of this device as given in FIGURE 6, the references EO5, EO7 and EO8 denote relays, EO5a, EO7a and EO8a denote the contacts controlled by the said relays, CS denotes a synchronisation checking contact cyclically controlled by a cam ECM the motor contactor, that is to say, the contactor which closes the feed circuit of the motor element when its winding is energised, the sign "+" denotes a terminal connected to the positive pole of a direct-current source, and EC1 and ER1 denote a condenser and a resistance forming a circuit element connected in shunt to the ends of the winding of the contactor.

The conductors disposed between the members hereinbefore enumerated are represented by lines joining the representations of these members. The conductors leading to the relays and to the contactor are connected to one of the ends of the windings of the said members, the other end of the said windings being connected to the negative pole of the direct-current source by a means which has been omitted from the drawing for the sake of simplicity. The contacts are marked by black or light triangles depending upon whether they are closed or open in the inoperative state.

The cam actuating the contact CS is driven by the driving shaft of the element, so that the closing of the contact CS makes it possible to locate the instant at which the said shaft is situated in a particular angular position.

Figure 7:
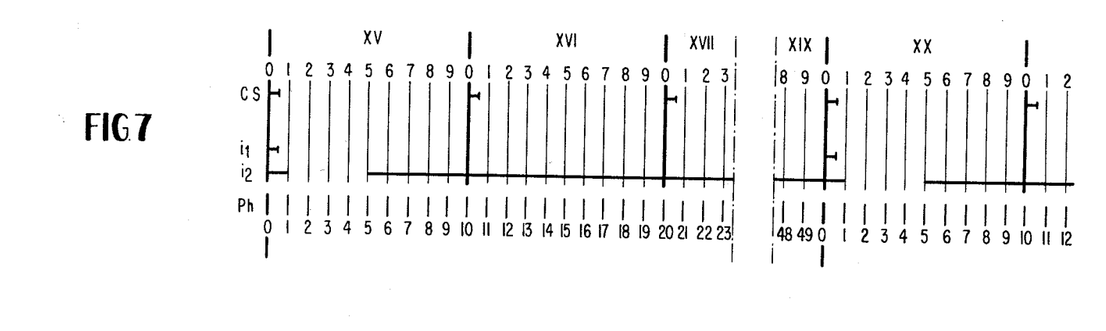
FIGURES 7 and 8 illustrate the closing times of certain cams and the times of occurrence of certain pulses during the operation of the devices illustrated in FIGURE 6.
Figure 8:
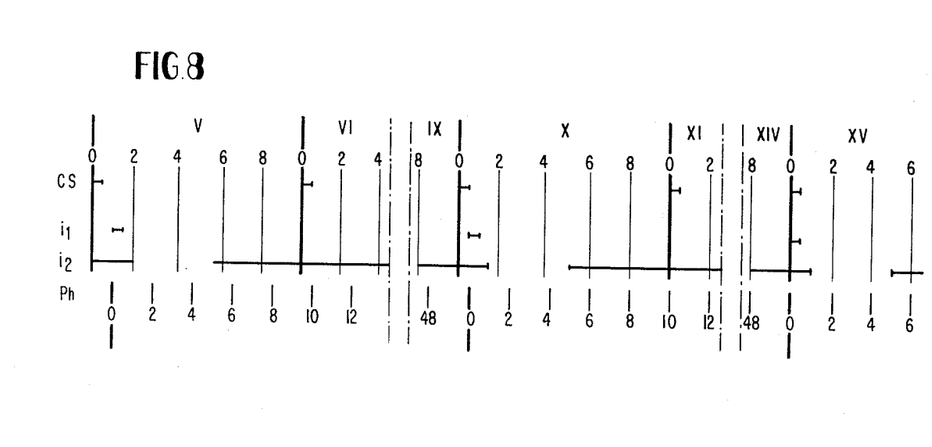

The synchronising device SEM is intended to be incorporated in an element operating in periodic cycles. Each cycle is assumed to correspond to one revolution of the driving shaft and is conventionally divided into six equal intervals to simplify the description. The location of the instants or "points of the cycle of the element" between which these intervals occur is indicated in FIGURES 7 and 8 by series of vertical lines numbered from 0 to 9 in Arabic figures for a certain number of cycles numbered in Roman figures. The point 0 of each cycle of the element is in practice determined by the closing of the cam-operated contact CS. The angular position occupied by the driving shaft of the element at reference instants marked in practice by the checking and control pulses emitted by the clock varies in the course of some of these cycles, as will hereinafter be explained.

The instants of the alternating-voltage cycles which serve to define the points of the clock cycle are represented in FIGURES 7 and 8 by series of vertical dashes $ph$ numbered from 0 to 49 in the case of certain clock cycles. FIGURES 7 and 8 also indicate the closing times of the cam-operated contacts CS and the times of occurrence of the checking and control pulses, i.e. $i1$ and $i2$, which are supplied by the clock to the conductors 1E1 and 1E2 respectively. As has previously been stated, the pulses $i1$ and $i2$ are emitted at particular instants of certain cycles of the alternating feed voltage.

It has been assumed that the frequency of the feed voltage of the motor is 50 cycles per second and that the speed of rotation of the driving shaft of the element, when its driving motor rotates synchronously, is 300 r.p.m., i.e. 5 revolutions per second, so that each revolution of the driving shaft, that is to say, each operating cycle of the element, extends over 10 cycles of the alternating voltage. It will be seen that if, as has been done, each cycle is conventionally divided into 10 intervals, each point of the cycle of the element corresponds, at synchronism, to a particular instant of the cycle of the feed voltage and consequently to a point of the clock cycle.

FIGURE 7 illustrates the relative position in time of the pulses $i1$ and $i2$ and of the closing and opening instants of the cam-operated contacts CS when the driving shaft of the element is located, at given reference instants, in the particular position corresponding to the case where the element is synchronised in phase with the clock.

It will be seen that the cam-operated contact CS closes at the point 0 of each operating cycle of the element and remains closed for a period equal to $\frac{1}{20}$ of the period of this cycle. The pulse $i1$ for checking the synchronisation have a period of 1 second. They occur, in the mode of operation under consideration, once every five cycles of the element at the point 0 of the said cycle and their duration is equal to a half-cycle of the alternating feed voltage, that is to say, in the present case to 1/20 of the period of the cycle of the element. In FIGURE 7, these pulses i1 are shown at the cycles XV and XX of the element and the point 0 of the clock cycle has been placed at the beginning of these pulses. The pulses i2 controlling the contactors have, like the pulses i1, a period of 1 second, and they extend over the greater part of this period. One of them occurs in the case of FIGURE 7 at the point 5 of a clock cycle and ends at the point 1 of the succeeding cycle. The interval between two consecutive pulses i2 is equal to 4 cycles of the alternating voltage. One of these intervals is represented in FIGURE 7 between the points 1 and 5 of the cycle XV of the element, while the succeeding interval is represented between the points 1 and 5 of the cycle XX.

Referring to FIGURE 6, it will be seen that when the pulse i1 applied to the contact stud EO1 coincides with the closing of the cam CS, as illustrated in FIGURE 7 in the case of the cycle XV, the relay EO8 is energised by the said pulse and closes its contact EO8a which connects the windings of the relays EO5 and EO7 to the positive terminal. The relays EO5 and EO7 are then energised and actuate their contact. The contact EO7a, which is closed, maintains the energisation of these relays. The contact EO5a, which is reversed, connects the winding of the contactor ECM to the closed contact EO7a, so that this winding, the energisation of which would be interrupted in the interval between the pulses i2 (FIGURE 7) if the contact EO5a were not reversed, is maintained energised as a result of the reversal of the said contact, by the circuit which maintains the relays EO5 and EO7 in the energised condition. The motor of the element is therefore continuously maintained in the fed condition and the element remains synchronised in phase with the clock as long as the positive terminal is fed with electrical current. The succeeding pulses i1 consequently coincide with the closing of the cam-operated contact CS, as is shown, for example, by FIGURE 8 in the case of the cycle XX.

FIGURE 8 shows the various relative positions of the closing instants of the cam-operated contact CS and of the pulses i1 and i2 in the course of an operation for bringing the element under consideration into phase. In order to simplify the explanation, it will be assumed that this operation takes place only after the instant when the motor of the element has reached the synchronous speed. This FIGURE 8 is analogous to FIGURE 7, but only one cycle point out of two has been marked therein in order to simplify the drawing.

In the course of the first cycle illustrated (cycle V), the closing of the cam-operated contact CS takes place with an advance of 1/10 of the cycle of the element in relation to the commencement of the synchronisation checking pulse i1, which occurs only at the point 1 of the said cycle, so that this pulse does not reach the relay EO8 (FIGURE 6) of the synchronising device SEM, and the contactor ECM remains controlled by the pulses i2, its winding remaining connected to the contact stud EO2 by normally closed contact EO5a. At the point 2 of the said cycle V, the end of a contactor controlling pulse i2 takes place. The commencement of the succeeding pulse i2 takes place after an interval equal to 4 cycles of the alternating voltage. During this interval, the feeding of the motor is interrupted. This interruption of the feeding has the effect of causing the rotor of the motor to slip through one pole pitch in relation to the rotating field.

In the course of the cycles VI, VII, VIII and IX, the motor is again fed without interruption, so that the rotor has time to become stabilised in its new position of equilibrium and, at the cycle X, the closing of the cam-operated contact CS takes place only with an advance of 1/20 of the cycle in relation to the synchronising pulse i1 which is set up between the points 0 and 1 of the said cycle. This pulse, however, occurs only after the opening of the contact CS, so that the same process of interrupting the feeding of the motor which has taken place in the course of the cycle V now takes place in the course of the cycle X, with a consequent further slip through one pole pitch and the closing of the contact CS at the cycle XV at the instant of the occurrence of the synchronising pulse i1. The element is then synchronised in phase with the clock and the process which takes place from the cycle XV has been described in detail in the foregoing with reference to FIGURES 6 and 7. The motor is from then on continuously fed and the element remains synchronised in phase with the clock.

The synchronising device SEM hereinbefore described is intended periodically to produce a momentary interruption of the feed of the motor of an element, as long as the said element is not synchronised in phase with the clock, so as to cause the rotor of the said motor to slip through a single pole pitch at each interruption, in relation to its rotating field. The duration of the interruption necessary for obtaining this result depends upon certain mechanical characteristics of the element and of the motor: moment of inertia, opposed torque and driving torque.

When the interval between two consecutive pulses i2 is greater than the appropriate period of interruption, it is possible to interrupt the feed for an appropriate period by connecting in shunt with the winding of the contactor ECM, as shown in FIGURE 6, a circuit element comprising a condenser EC1 and a resistance ER1 in series. The duration of the interruption obtained is then less than the interval between two pulses i2 and depends to some extent upon the values of EC1 and ER1.

It is also proposed in accordance with the invention to effect a controlled braking of the driving motor of an element during the interruption of its feed in such manner as to obtain in a predetermined short interval of time the slip of the rotor of the said motor through one pole pitch in relation to the rotating field.

More especially, it is proposed in accordance with the invention to effect the said controlled braking by connecting a condenser across the terminals of a field winding of the said motor during the interruption of the feed of the said motor.

Figure 13:
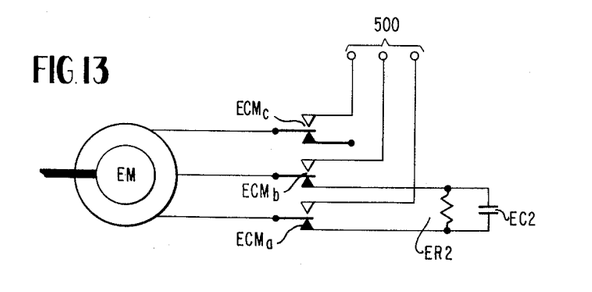
FIGURE 13 illustrates a device for carrying out a controlled braking of a synchronous motor when its feed is interrupted.

FIGURE 13 shows the said condenser EC2 connected to the normally closed contacts ECMa and ECMb of the contactor ECM controlling the feed of the synchronous three-phase motor EM driving an element or a section of an element.

When the winding of the contactor ECM is energized, the field windings of the motor EM are connected across the terminals 500 of the three-phase alternating-voltage supply system of the normally open contacts ECMa, ECMb, ECMc of the contractor ECM. When the winding of the contactor ECM ceases to be energised, the normally closed contacts ECMa and ECMb of the said contactor connect the field windings of the motor EM across the terminals of the condenser EC2. A current flows in the circuit thus established and has the effect of producing a reduction in the speed of the motor EM in a manner which depends upon the value of the condenser EC2. A resistance ER2 of high value, connected in shunt across the terminals of the condenser EC2, has the effect of discharging the said condenser between the interruption in the feed of the motor.

When the phase synchronising device described with reference to FIGURES 6 to 8 is employed, the successive momentary interruptions in the feed of the motor of the element takes place at fixed instants during the clock cycle. They therefore do not occur at fixed instants in the cycle of the element. It will be seen, for example, from FIGURE 8 that an interruption takes place at the point 2 of the cycle V of the element, while the succeeding interruption takes place between the points 1 and 2 of the cycle X. This is due to the fact that the said interruptions are produced directly by the end of the pulses $i2$ emitted by the clock. These pulses terminate at the point 1 of each cycle of the clock and this point 1 of the cycle of the clock can coincide with 20 different particular instants of a cycle of the element, depending upon the phase difference between the element and the clock. It may happen that the interruptions occurring at certain ones of these instants do not produce the same effect as the interruptions occurring at certain other instants when the opposed torque of the element varies considerably in the course of the cycle of operation of the element, because if the duration of the interruption is not exactly equal to the duration of one or more cycles, the opposed work during the interruption depends upon the instants between which this interruption takes place.

It may happen that the interruption occurring at certain instants of the cycle of the element produces a slip of the rotor through a number of successive positions of equilibrium or produces no slip. It then becomes impossible for the element to be brought into phase. This disadvantage is avoided in accordance with the invention by effecting the interruption of the feed of the motor of one element between particular fixed instants of the cycle of the said element.

In a second constructional form of the synchronising device according to the invention, this result is achieved by effecting the interruption by controlling the motor contactor by means of a contact actuated by a cam keyed on the driving shaft of the element.

Figure 9:
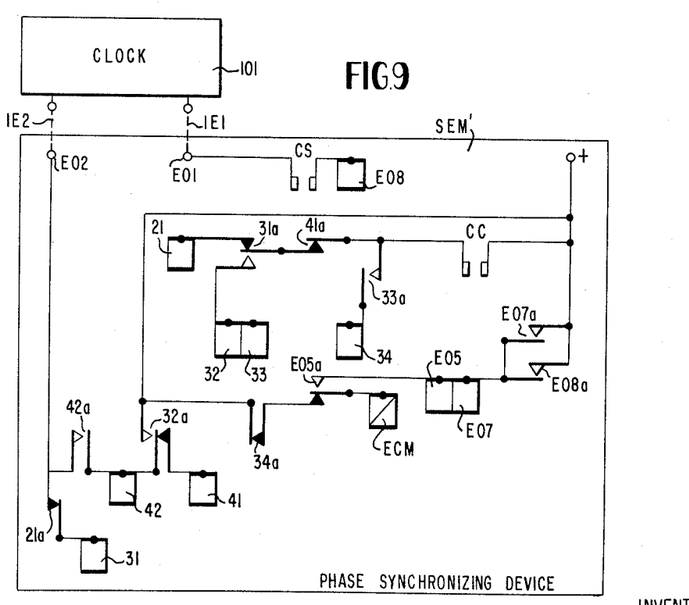
FIGURE 9 illustrates the electric circuit of a synchronising device in accordance with a second embodiment of the invention.

This second constructional form of the phase synchronising device is illustrated in FIGURE 9. In this figure, parts identical to those illustrated in FIGURE 6 are denoted by the same reference.

Electrical conductors 1E1 and 1E2 are disposed between the clock 101 and the input contact studs EO1 and EO2, respectively, of the said synchronising device SEM'.

In the diagrammatic illustration given in FIGURE 9, the references EO5, EO7, EO8, 21, 31, 32, 33, 34, 41, 42 denote relays, the same references followed by the letter "$a$" denote the contacts controlled by these relays, the references CC and CS denote respectively an interruption controlling contact and a synchronisation checking contact, ECM denotes the motor contactor, and the sign "+," denotes a terminal connected to the positive pole of a direct-current source. The conductors disposed between the above-enumerated members are represented by lines. FIGURE 9 has been drawn with the same simplifications and conventions as FIGURE 6. The contacts CS and CC are each actuated by cams driven by the driving shaft of the element in which the device SEM' is incorporated.

Figure 10:
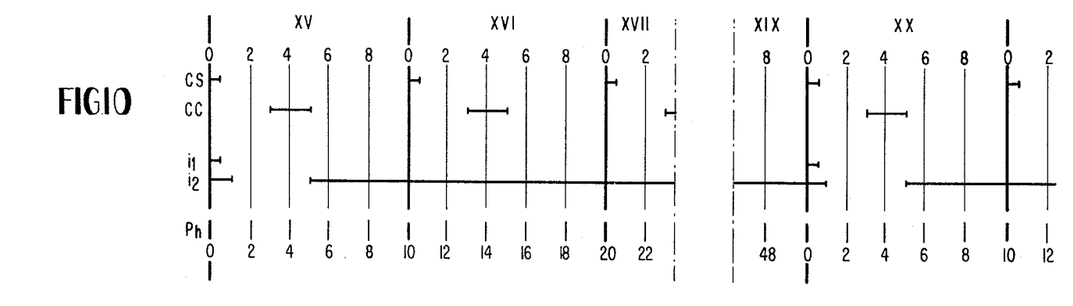
FIGURES 10 and 11 show the closing times of certain cams and the times of occurrence of certain pulses during the operation of the devices illustrated in FIGURE 9.
Figure 11:
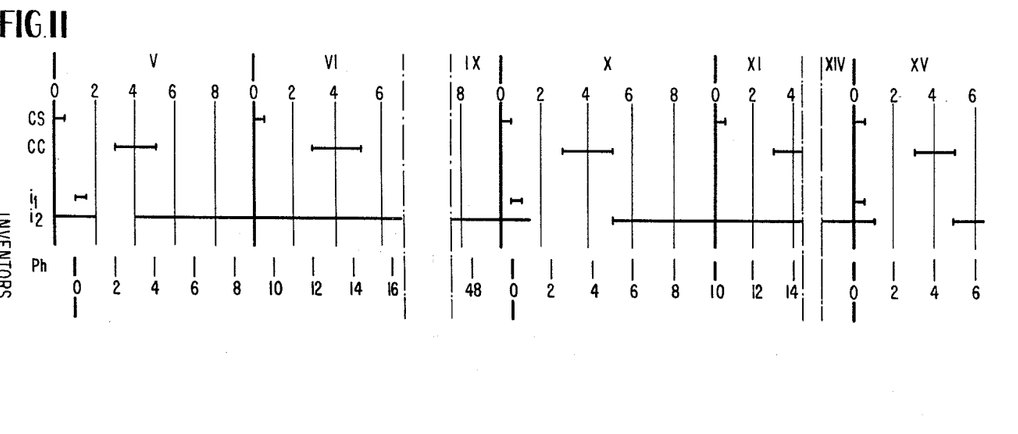

FIGURES 10 and 11 are similar to FIGURES 7 and 8 respectively. They show, in different cases of operation of the device SEM' illustrated in FIGURE 9, the relative positions of the points of the cycle of the element, of the points of the cycle of the clock, of the closing times of the cam-operated contacts CS and CC and of the times of occurrence of the checking and control pulses, $i1$ and $i2$ supplied by the clock to the conductors 1E1 and 1E2 respectively, for a certain number of cycles of the element.

FIGURE 10 supplies the above-indicated particulars in the case where the driving shaft of the element is situated, at given reference instants, in the particular angular position for which the element is synchronised in phase with the clock.

When the pulse $i1$ coincides with the closing of the cam CS, as shown by FIGURE 10 in the case of the cycle XV, the relay EO8 (FIGURE 9) is energised by the said pulse applied to the contact stud EO1 and closes its contact EO8$a$. Consequently as explained with reference to FIGURE 6, the relays EO5 and EO7 and the contactor ECM are energised and maintained energised by the current transmitted by the positive terminal, so that the motor of the element is continuously fed and the element remains synchronised in phase as long as the said positive terminal is fed with electrical current.

FIGURE 11 supplies the same particulars as FIGURE 10 in the case of an operation for bringing the element into phase.

In the course of the first cycle illustrated (cycle V), the closing of the cam-operated contact CS and the beginning of the pulse $i1$ for checking the synchronisation are offset by $\frac{1}{10}$ of a cycle of the element and the cam-operated contact CS opens before the application of the pulse $i1$, so that the latter does not reach the relay EO8 (FIGURE 9). Consequently, the contact EO5$a$ remains in its inoperative position and the operation of the contactor ECM is checked by the contact 34$a$. This contact transmits, when in the inoperative position, the current supplied by the positive terminal to the winding of the contactor ECM and it would open at each cycle as a result of the energisation of the relay 34 if the contact 33$a$ were closed during the closing of the cam-operated contact CC. The said contact CC closes at each cycle of the element between the points 3 and 5. These points are chosen in accordance with the mechanical characteristics of the element and of the motor, so that an interruption of the feed of the motor, which may be produced by the closing of the said contact CC under the conditions which will hereinafter be explained, has the effect of causing the rotor to slip only through one pole pitch in relation to the rotating field.

The contact 33$a$, however, does not close at each cycle of the element, but only once per clock cycle, as will now be explained, so as to allow the rotating part sufficient time to become stabilised in its new position of equilibrium after each interruption of the feed of the motor.

A pulse $i2$ terminates at the point 2 of the cycle V. On termination of the said pulse $i2$, all the contacts of the synchronising device SEM' are inoperative, the pulse supplied by the contact CC at the point 3 of the said cycle reaches the relay 21, and the latter opens its contact 21$a$. When the contact CC opens at the point 5 of the cycle V, the relay 21 ceases to be energised, the contact 21$a$ closes again and when the new pulse $i2$ occurs at the point 6 of the said cycle, the relay 31 is energised and reverses its contact 31$a$, so that the succeeding pulse supplied by the contact CC at the point 3 of the succeeding cycle energises the relays 32 and 33. The contact 32$a$ establishes, when reversed, a circuit between the positive terminal and the relay 42, which, on becoming energised, closes its contact 42$a$. The said contact establishes a holding circuit for the relay 42. At the same time, the contact 33$a$ closes, so that the pulse supplied by the contact CC at the point 3 of the cycle VI is applied to the relay 34, which becomes energised.

When the contact CC opens at the point 5 of the cycle VI, the relays 32 and 33 cease to be energised. The contact 33$a$ opens and the relay 34 ceases to be energised. The contact 32$a$, on being reversed, applies the pulse $i2$ to the relay 41, which becomes energised and opens its contact 41$a$, so that the succeeding pulses supplied by the contact CC between the points 3 and 5 of the cycles VII, VIII and IX cannot again energise the relays 32 and 33.

The relay 34 having been energised between the points 3 and 5 of the cycle VI, as has just been seen, its contact 34$a$ opens and breaks the energising circuit of the contactor ECM, which opens between the same points 3 and 5 of the said cycle. The feed of the motor of the element is thus interrupted between these points. The rotor of this motor slips through one pole pitch, so that at the cycle X the phase difference between the closing of the cam-operated contact CS and the beginning of the pulse $i1$ is then only $\frac{1}{20}$ of a cycle. The contact CS opens at the instant of the occurrence of the pulse $i1$, the latter therefore does not reach the relay EO8, and the contactor ECM remains under the control of the contact 34a. In the course of this cycle X, the pulse i2 ends slightly before the point 2 of this cycle, that is to say, before the closing of the cam-operated contact CC. Consequently, the relays 34, 42 and 31 cease to be energised, the contacts 34a, 42a and 31a return to their inoperative position, and the whole circuit is restored to the state in which it was at the point 2 of the cycle V.

Under these conditions, the pulse supplied by the contact CC at the point 3 of the said cycle X reaches the relay 21, which opens its contact 21a, and the same process which took place in the course of the cycles V to X now takes place in the course of the cycles X to XV, which results in a slip through a further pole pitch and the closing of the contact CS at the cycle XV at the instant of the occurrence of the synchronising pulse i1. The element is then synchronised in phase with the clock. The process which takes place from the cycle XV has previously been described with reference to FIGURES 9 and 10.

It has just been seen that the pulses i2 control a relay circuit in such manner that the contact 33a closes only once per clock cycle. It will be obvious that the pulses i1 could be utilised instead of the pulses i2 to control an appropriate relay circuit capable of producing the same result.

After the operations for bringing an element into phase by means of a synchronising device of the type (SEM or SEM') previously described, which operate, as has been seen, under the control of periodic pulses i1 supplied by the clock, it is necessary for the maintenance of the synchronism of the element to be supervised, and any material phase difference must result in the stoppage of this element. Detection of the phase difference can take place at each cycle of the clock by means of a circuit comprising some of the members of the said synchronising device, more especially the cam-operated contact CS and the relay EO8, and such a circuit for detecting and indicating the phase difference may be controlled by the control pulses i1 which the clock continues to supply after the operations of bringing the element into phase.

Figure 12:
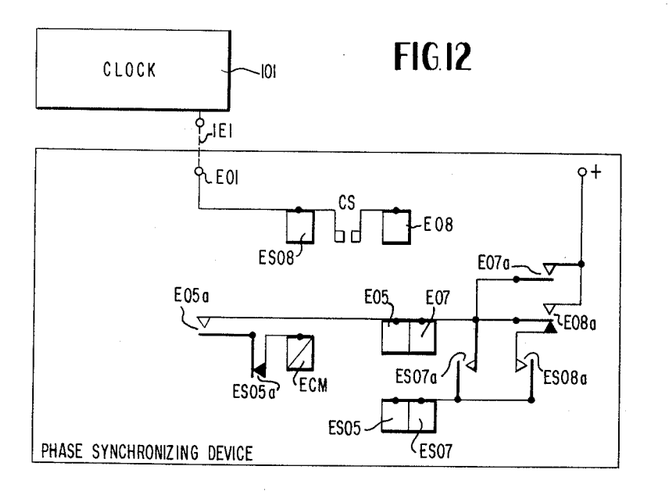
FIGURE 12 illustrates the electric circuit of a phase difference detecting device.

Such a phase difference detecting circuit is illustrated in FIGURE 12. In this figure, the same references have been employed to denote those members of FIGURES 6 and 9 which affect the operation of the phase difference detecting circuit. In addition to these parts, there are shown relays denoted by the references ESO5, ESO7, and contacts actuated by these relays and denoted by the same references followed by the letter a. It will be noted that in this circuit the relay EO8 of the synchronising device controls a make-and-break contact EO8a.

It will be seen that the relay ESO8 is energised at each cycle of the clock 101 when the pulse i1 occurs at the contact stud EO1, while the relay EO8 is not energised by the same pulse unless the cam-operated contact CS closes at the instant of the occurrence of this pulse, that is to say, that the element is synchronised in phase with the clock. In this case, the contact ESO8a closes, while the contact EO8a is reversed, so that the relays ESO5 and ESO7 remain cut off from the positive terminal.

If the element is phase-shifted in the course of a cycle of the clock, the cam-operated contact CS does not close at the instant of the occurrence of the pulse i1, the contact EO8a is not reversed at the instant when the contact ESO8a closes, the relays ESO5 and ESO7 are then energised, the contact ESO7a, on closing, establishes a holding circuit for these relays, and the contact ESO5a, on opening, effects the interruption of the feed of the motor of the element.

We claim:

In a record controlled data processing system comprising in combination mechanically independent cyclically operating sections which are adapted to operate at the same cycle frequency and a coordination unit including a cyclic clock pulse generator which operates in synchronism with an alternating current source the frequency of which is a multiple of the frequency of the operating cycle of the sections, each section including a synchronous motor energised from said alternating current source for driving the section at said cycle frequency and a phase synchronising device electrically connected to said generator and controlled thereby to cause the section to operate synchronously and in a predetermined phase relation with said generator, the synchronous motor of a section being connected to said alternating current source through the contacts of a contactor having a control winding, the phase synchronizing device of such a section comprising said control winding, a relay, contacts controlled by said relay, means for energising said relay when such a section operates synchronously and in said predetermined phase relation with said generator, a synchronizing current generator driven by the motor of such a section for supplying a synchronising current which is interrupted between fixed predetermined instants of the operating cycle of such a section, and means for connecting said control winding through said relay controlled contacts either to said generator or to said synchronising current circuit depending on the state of energisation of said relay.

References Cited by the Examiner

UNITED STATES PATENTS

| | | | |
|---|---|---|---|
| 1,658,660 | 2/28 | Traver | 318—75 |
| 1,963,087 | 6/34 | Hay | 318—75 |
| 2,239,101 | 4/41 | Jeffers | 318—75 |
| 2,239,244 | 4/41 | Nelson | 318—85 |
| 2,418,112 | 4/47 | De Rosa | 318—41 |
| 2,462,898 | 3/49 | Richardson et al. | 318—75 X |
| 2,506,766 | 5/50 | Bartelink | 318—85 X |
| 2,533,473 | 12/50 | Kille | 318—75 |
| 2,628,279 | 2/53 | Roe | 318—85 X |
| 2,733,392 | 1/56 | Wright | 318—85 |
| 2,848,671 | 8/58 | McDonald | 318—85 X |
| 2,894,187 | 7/59 | Chapman | 318—85 X |
| 2,946,986 | 7/60 | Harrison | 340—172.5 |
| 3,003,092 | 10/61 | Campbell | 318—41 |
| 3,054,913 | 9/62 | Pennow | 318—41 X |
| 3,064,173 | 11/62 | Breen et al. | 318—85 X |
| 3,135,905 | 6/64 | Malcho | 318—74 |

OTHER REFERENCES

IBM Reference Manual, RAMAC 305, International Business Machines Corporation.

ORIS L. RADER, *Primary Examiner.*

STEPHEN W. CAPELLI, *Examiner.*